(12) United States Patent
Xie (10) Patent No.: US 7,192,040 B2
(45) Date of Patent: Mar. 20, 2007

(54) DRIVE MECHANISM FOR VEHICLE

(76) Inventor: Shouchun Xie, Suite 102, No. 49, Lane 2999, Qixin Road, Minhang District, Shanghai (CN) 201101

( * ) Notice: Subject to any disclaimer, the term of this patent is extended or adjusted under 35 U.S.C. 154(b) by 419 days.

(21) Appl. No.: 10/814,204

(22) Filed: Mar. 31, 2004

(65) Prior Publication Data

US 2005/0134014 A1   Jun. 23, 2005

(30) Foreign Application Priority Data

Dec. 17, 2003   (CN) .................. 2003 2 0127977
Jan. 12, 2004   (CN) .................. 2004 2 0000614

(51) Int. Cl.
*B62D 7/16* (2006.01)

(52) U.S. Cl. ............... 280/93.502; 180/216; 180/24.07

(58) Field of Classification Search .......... 280/93.502, 280/93.51, 771; 180/21, 218, 210, 215, 216, 180/208, 211, 24.1, 24.07, 24.08, 6.48, 6.5
See application file for complete search history.

(56) References Cited

U.S. PATENT DOCUMENTS

| 3,166,141 | A * | 1/1965 | Shields et al. | 180/21 |
| 4,534,439 | A * | 8/1985 | Shimazaki et al. | 180/215 |
| 4,750,578 | A * | 6/1988 | Brandenfels | 180/13 |
| 6,732,823 | B2 * | 5/2004 | Furuta | 180/19.2 |
| 6,907,949 | B1 * | 6/2005 | Wang | 180/65.5 |
| 6,969,079 | B2 * | 11/2005 | Kamen et al. | 280/204 |
| 2002/0149172 | A1 * | 10/2002 | Field et al. | 280/446.1 |
| 2003/0188906 | A1 * | 10/2003 | Bank | 180/210 |
| 2004/0016584 | A1 * | 1/2004 | Kamen et al. | 180/218 |
| 2004/0216929 | A1 * | 11/2004 | White | 180/2.2 |
| 2006/0011398 | A1 * | 1/2006 | Kamen et al. | 180/218 |
| 2006/0054370 | A1 * | 3/2006 | Sugioka et al. | 180/211 |

FOREIGN PATENT DOCUMENTS

| CN | 1440901 A | 2/2002 |
| CN | 2532004 Y | 3/2002 |

* cited by examiner

*Primary Examiner*—Paul N. Dickson
*Assistant Examiner*—Drew J. Brown
(74) *Attorney, Agent, or Firm*—Knobbe, Martens, Olson & Bear, LLP (57) ABSTRACT

The present invention provides an electric-driven vehicle, which comprises a supporting platform and an upright tube, wherein the supporting platform has first and second ends and a longitudinal axis perpendicular to the first and second ends, the upright tube is fitted at the first end of the supporting platform and operatively connected with the supporting platform, a handle frame is provided on a top end of the upright tube. The electric-driven vehicle further includes two driving wheels operatively mounted at opposite sides of the first end of the supporting platform, at least one steering wheel operatively mounted on a bottom of the second end of the supporting platform, a driving means for the driving wheels, and a power supply means mounted on the bottom of the supporting platform and electrically connected with the driving means. The present invention also provides a support platform structure for an electric-driven vehicle, which comprises a first portion and a second portion, wherein the first portion having sleeves for operatively mounting the driving wheels, and a first side; the second portion having a steering knuckle for operatively mounting the steering wheels, and a second side corresponding to the first side; the first side and the second side are connected via a connecting member, and at least one of the first side and the second side can rotate about the bond-linkage element.

32 Claims, 10 Drawing Sheets

DRIVE MECHANISM FOR VEHICLE

CLAIM OF PRIORITY

This application claims priority to Chinese Patent Application No. 2003201279777 filed on Dec. 17, 2003 and Chinese Patent Application No. 2004200006141 filed on Jan. 12, 2004 under 35 U.S.C. §119(e) and are hereby incorporated by reference in their entirety herein.

BACKGROUND OF THE INVENTION

1. Field of the Invention

The present invention relates to vehicles, and particularly, to an electric-driven vehicle.

2. Description of the Related Art

Nowadays, vehicles have become transportation means indispensable in people's daily life, such as automobiles and motorcycles. However, in order to decrease the air pollution caused by vehicles, various electric-driven vehicles have been developing.

Chinese Patent No. ZL 02216290.9 disclosed a four-wheel electric-driven vehicle. It has a chassis frame, a handle frame, a seat, a rechargeable battery, two front wheels, and two rear wheels. The handle frame is operatively provided at a front end of the chassis frame. The seat is fixed at a rear end of the chassis frame. The front and rear wheels are rotatably mounted at opposite sides of the front and rear end of the chassis frame, respectively. The battery provides power supply for the vehicle. The electric-driven vehicle is steered by controlling the front wheels via the handle frame. This electric-driven vehicle is characterized in that two steering members are respectively provided at inner sides of the two front wheels, the handle frame is fixed on a top end of a front frame tube, which is operatively provided on the front end of the chassis, a projected portion is formed at a lower end of the front frame tube, and two link rods respectively have two first ends thereof pivotally connected with the projected portion via cardan joints and two second ends thereof pivotally connected with the steering members provided at the inner sides of the front wheels, whereby the front wheels are steerable via the link rods and the front tube by controlling the handle frame. However, the structure of the electric-driven vehicle allows only the front wheels steerable, but the rear wheels driven by the power supply not steerable. So, the movement tracks of the front and rear wheels are different in a veer. In this case, the rear, wheels may be obstructed while the front wheels may just pass by the obstruct, thereby leading to a low safety. Moreover, the electric-driven vehicle does not only occupy a large occupation area, but also unwieldy, un-collapsible and difficult for transportation. Furthermore, it is insecure for a rider during the running of the vehicle as it might be in a state with three wheels on the ground but one wheel hanging in the air when it is on the uneven ground due to the rigidity of the chassis frame.

Figure 1:
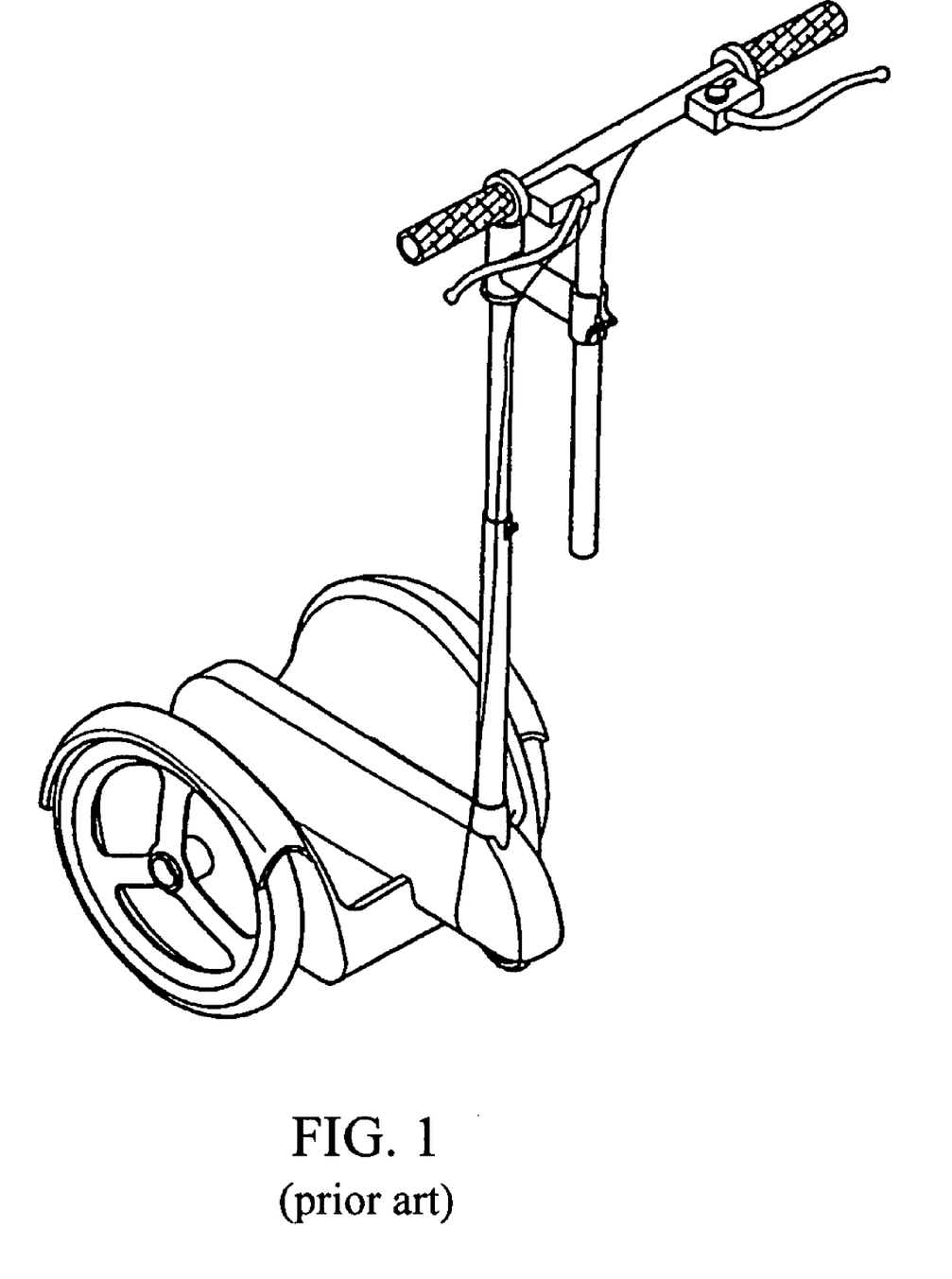
FIG. 1 is a perspective view of an electric-driven vehicle of the prior art.

Chinese Patent No. ZL 02109213.3 disclosed an electric-driven vehicle structure, as shown in FIG. 1. It has a supporting platform and a steering shaft pivotally connected with the supporting platform. Its two auxiliary wheels are respectively provided at opposite sides of a front end of the supporting platform, and an electric-driven wheel with smaller diameter is provided at a center of a rear end of the supporting platform and connected at a lower end of the steering shaft. A battery provided at the rear end of the supporting platform is electrically connected with a motor of the electrical driving wheel or the auxiliary wheels, so the electric-driven vehicle is able to move forward or backward. Additionally, the steering shaft is an extendable multi-section member, angle of which may be adjustable in forward, backward, upward, and downward directions. This electric-driven vehicle has a structure of two driving rear wheels and one steering front wheel may easily turnover in the driving, which leads to instability. Moreover, the battery is received in a raised portion in a middle of the platform of the vehicle. When a rider drives the electric-driven vehicle, he/she must stand on the platform by his/her feet at opposite sides of the raised portion, that is to say, the rider may not easy to get free from the vehicle, i.e. the rider is kept from getting rid of the vehicle by the raised portion of the vehicle in an emergency, such as a turnover of the vehicle, therefore, the rider may be injured in this case.

A two-wheel scooter-like personal mobility vehicle, Segway Human Transporter, was developed by Dean Kamen in December 2001. The Segway HT uses twin NiMH battery packs as its power supply, and five electric gyroscopes in order to keep constant balance of the vehicle. A rider may control the vehicle to move forward or backward or even stop by simply leaning the rider's body forward or backward, and may also turn the left handlebar to change the direction of the vehicle by changing the speed of the left and right wheels. When the wheels of the opposite sides respectively rotate in a reverse direction, the vehicle may turn around at the original point. This type of personal mobility vehicle came into the US market in March 2003, and had been sold for more than 6,000 sets in a short period. They firstly went into trade use and public use, for example, US Post Office, express companies, police offices, supermarkets, storehouses, and offices are their earlier consumers, and individual purchases existed either. The major advantage of Segway HT is that the occupancy area of the vehicle is less than one step walking area of a person (width of both are equal, but the length of Segway HT is less than one step length of an adult). Therefore, it can be used in various circumstances including indoors, as for examples, passing through corridors and entering elevators etc. One disadvantage of the Segway HT is that the vehicle is only movable on a plan and smooth ground surface, if there are any obstacles on the way in front of the wheels of the vehicle, the rider standing on the supporting platform of the vehicle would certainly incline forward due to the inertia, while it is not possible for the electric gyroscopes to response and keep the whole vehicle in balance immediately. Three persons had been injured since Sep. 27th, 2003, the US Consumer Product Safety Commission (CPSC) declared that they had asked Segway LLC to recall all the sold products for the safety reason. Furthermore, the operation of Segway HT is complex, and it even takes a US policeman a whole day to train how to ride and control the vehicle.

Therefore, there is a necessary to provide an improved electric-driven vehicle, which has not only most advantages of the prior art, but also further advantages of more steady stability, more simple structure, better steering agility, more easy to be transported and can be operated in both indoor and outdoor conveniently in comparison with electric-driven vehicles of the prior arts, such as Segway HT.

Furthermore, a supporting structure is needed to provide to the electric-driven vehicle, which employs a flexible structure, solving the problem of one wheel hanging in the air when on the uneven ground.

SUMMARY OF THE INVENTION

An object of the present invention is to provide an electric-driven vehicle, which uses only a small occupancy area and is intended to ride either on the roads outdoors or indoors.

Another object of the present invention is to provide an electric-driven vehicle having a simple structure and a good stability.

A further object of the present invention is to provide an electric-driven vehicle being collapsible and convenient for transportation.

Yet, another object of the present invention is to provide an electric-driven vehicle having a good steering agility and operative convenience and a function of being able to turn around at the original point.

Still another object of the present invention is to provide a supporting platform for an electric-driven vehicle, which can solve the problem of the above the problems in the art.

In order to obtain the above objects, the present invention provides an electric-driven vehicle comprising a supporting platform of a first end, a second end and a longitudinal axis perpendicular to the first and second ends; an upright tube provided at a first end of the supporting platform and operatively connected with the supporting platform and having a handle frame provided on a top end thereof; power supply means; driving means electrically connected with the power supply means; two driving wheels driven by the driving means and operatively mounted at opposite sides of the first end of the supporting platform and parallel to the longitudinal axis. The electric-driven vehicle further comprises at least one steering wheel mounted on a bottom of the second end portion of the supporting platform.

The two driving wheels of the electric-driven vehicle include a left driving wheel and a right driving wheel, which are respectively provided with two driving means in order to drive the left and right driving wheels to rotate. The driving means of the present invention includes a left electric hub and a right electric hub. Two steering wheels, i.e. a first steering wheel and a second steering wheel (also called as a left steering wheel and a right steering wheel) are operatively connected with the supporting platform via a first steering knuckle and a second steering knuckle. The power supply means is provide on the bottom of the supporting platform and electrically connected with the left and right electric hubs to supply power for the left and right electric hubs. Additionally, a steering control arrangement is installed in the supporting platform. The steering control arrangement has a first end thereof fixedly connected with a lower end of the upright tube, and at least one second end thereof connected with at least one steering knuckle. The torsion of the upright tube is transmitted to the steering knuckle via the steering control arrangement to drive the steering wheel, thereby the electric-driven vehicle turns accordingly. The steering wheels turns about a same center in the turning, which comply with the steering principle of the trapezoidal four-wheel structure.

The steering control arrangement of the electric-driven vehicle comprises a driving rocker having a first end thereof fixedly connected with the steering post provided at the lower end of the upright tube so as to turn along with the upright tube; a pull-rod having a first end thereof pivotally connected with a second end of the driving rocker; an L-shaped rocker having a pivot center pivotally connected with the supporting platform, and a first end thereof pivotally connected with a second end of the pull-rod; at least one link rod having a first end thereof pivotally connected with a second end of the L-shaped rocker; and at least one driven rocker having a first end thereof pivotally connected with a second end of the at least one link rod, and a second end thereof fixedly connected with a steering knuckle so as to drive the steering knuckle to rotate.

The handle frame is extendably fitted on the top end of the upright tube and able to be positioned or re-positioned by a quick clamping device provided on the upright tube. The lower end of the upright tube is pivotally connected with the supporting platform, thereby the upright tube is selectively collapsible towards the second end of the supporting platform.

The driving means of the electric-driven vehicle includes two electric hubs respectively installed in middle of the two driving wheels. Two controllers, a left controller and a right controller, are provided under the supporting platform, and electrically connected with the left electric hub and the right electric hub respectively. The left and right controllers are electrically connected with the power supply means via a relay unit.

The first steering wheel and the second steering wheel of the electric-driven vehicle are respectively connected with a left steering sensor and a right steering sensor, which are electrically connected with the left controller and the right controller.

The electric-driven vehicle has a reverse switch provided on the handle frame. A first end of the reverse switch is electrically connected to the power supply means, and a second end of the reverse switch is electrically connected to the relay unit, thereby the electric-driven vehicle is able to be reversed. The handle frame is provided with a high-low-speed switch, which is electrically connected with the left electric hub and the right electric hub in order to regulate the speed of the left electric hub and the right electric hub. The handle frame is further provided with a braking grip and an accelerator handlebar. The accelerator handlebar is electrically connected with the left controller and the right controller in order to enable the left and right electric hubs to start and accelerate continuously and smoothly. The braking grip is also electrically connected with the left and right controllers, the left and right electric hubs are cut off power by the left and right controllers in a braking. A front side of the handle frame is provided with a headlamp electrically connected with the power supply means via a lamp switch provided on the handle frame. The handle frame is further provided with direction signal lamps electrically connected with the power supply means via switches of the direction signal lamps. The second end of the supporting platform is provided with back lamps and braking lamps. The back lamps are electrically connected with the power supply means via the lamp switch provided on the handle frame, when the headlamp is switched on, the back lamp is lighted at the same time. The braking lamps are electrically connected with the power supply means via the braking grip on the handle frame. When in a braking, the left and right electric hubs are power cut off by the left and right controllers, thereby the left and right driving wheels stop running, and the braking lamps and a braking indicator light provided on a panel are lighted.

The electric-driven vehicle may be provided with a klaxon and switches of the klaxon, a mudguard on a top of the driving wheel, and may also be provided with a contracting brake so as to perform a whole vehicle braking. Alternatively, a tray brake system can be provided on the steering wheel. Further, the electric hubs can be provided with function of regenerated braking to ensure a good performance of braking even on a smooth road surface.

The handle frame of the electric-driven vehicle is formed with a fixing seat. The braking grip is pivotally connected with the fixing seat via a pivot pin at a first end thereof, and is defined with a notch proximal to the first end thereof. A brake locking mechanism is also provided on the handle frame, the brake locking mechanism comprises a locking member having a first end thereof pivotally connected to the fixing seat via a pivot disposed at an interval from the pivot pin of the braking grip, the locking member being provided with a spindle corresponding to the shape of the notch; and a resilient member mounted around the pivot of the locking member and having a first end thereof connected with the fixing seat and a second end thereof biased against the locking member. The braking grip is retained at a normal un-braking original position by the resilience of the resilient member. The resilient member may be a resilient coil spring. When the braking grip is gripped inwardly and the locking member is shifted into the locking position, the spindle of the locking member is locked into the notch defined in the braking grip, thereby the braking grip is kept from returning to the original position and the vehicle is locked in the braking status. In this case, even a rider's hand departs from the braking grip, the electric-driven vehicle is still retained on a 10° slope in the brake locking status. At this time, a red indicator light on the panel is automatically switched on to indicate the status of the brake locking, and the electric hubs are power interrupted automatically. The electric-driven vehicle could be easily released from the brake locking status by simply gripping the braking grip inwardly once more.

The panel of the electrical personal mobility vehicle is further provided with illuminant means electrically connected with the power supply means for indication of various status of the vehicle. The illuminant means includes five LEDs of different colors, a first LED for indication of the power supply, a second LED for indication of reverse movement of the vehicle, a third LED for indication of the low speed, a fourth LED for indication of lamps, and a fifth LED for indication of the braking and power interrupted status or brake locking status.

The electric-driven vehicle according to the present invention has following advantages in comparison with the prior art:

(1) the electric-driven vehicle according to the present invention uses less occupancy area, therefore it is adapted to be rode both indoors and outdoors;

(2) due to the four-wheels structure of the electric-driven vehicle according to the present invention, the stability and safety of the electric-driven vehicle is improved;

(3) due to the trapezoidal structure of the steering control arrangement of the electric-driven vehicle according to the present invention, the electric-driven vehicle becomes more convenient, agility and reliability, and has a function of being able to turn around at the original point;

(4) the electric-driven vehicle according to the present invention is provided with two steps of speed range, high and low speed steps, each one being able to be regulated continuously, therefore the running and acceleration of the vehicle become more safety and reliability;

(5) the electric-driven vehicle according to the present invention is provided with a reverse function, the speed of the reverse is automatically reduced 30% less of the speed of the vehicle running in forward direction, therefore the safety of the electric-driven vehicle is improved;

(6) the electric-driven vehicle according to the present invention is further provided with a headlamp, direction signal lamps, back lamps, braking lamps and a klaxon, therefore safety of the operation of the electric-driven vehicle is ensured;

(7) the handle frame of the electric-driven vehicle according to the present invention is extendable with respect to the upright tube, and the upright tube is collapsible towards the second end of the supporting platform, so that the electric-driven vehicle is able to be transported more conveniently;

(8) the electric-driven vehicle according to the present invention is provided with the panel, which is intended to display the operation status of the electric-driven vehicle;

(9) the electric-driven vehicle according to the present invention is able to be operated more conveniently, and (10) the electric-driven vehicle according to the present invention is able to be inclined to one side to do some acrobatics, so as to enjoy the rider with exciting experiences, such as skiing or surfing or the likes.

The electric-driven vehicle is provided with supporting platform comprising a first portion and a second portion, wherein the first portion having sleeves for operatively mounting the driving wheels, and a first side; the second portion having a steering knuckle for operatively mounting the steering wheels, and a second side corresponding to the first side; the first side and the second side are connected through a bond-linkage element, and at least one of the first side and the second side can rotate about the bond-linkage element.

The above connecting member is an axis provided in the middle of and perpendicular to the first side of the first portion, and in the same plane with the first portion. A hole for inserting the axis is set in a position corresponding to the axis in the second side of the second portion.

Alternatively, the above the connecting member is an axis provided in the middle of and perpendicular to the second side of the first portion, and in the same plane with the second portion. A hole for inserting the axis is set in a position corresponding to the axis on the first side of the first portion.

Screw threads for engage with nut are provided on the end distant from the fixed ends to prevent the disengagement of the first portion and the second portion.

In the supporting platform structure, a position limit member can be provided on the second portion for limiting the position of the second portion when the second portion rotates around the axis. Alternatively, the position limit member can be provided on the first portion for limiting the position of the first portion when the first portion rotates around the axis. The position limit member can be formed with the first or second portion as a whole. The angle that the first side of the first portion or the second side of the second portion rotates around the axis is no more than ±3°.

In the supporting platform structure, the axis can be formed with the first side of the first portion or the second side of the second portion as a whole.

Compared with the conventional supporting platform, the advantage of the supporting platform for the electric-driven vehicle in the present invention is that it overcomes the insecure factor of the three wheels on the ground by employing a rocking structure with the first portion and the second portion rotating around an axis.

DETAILED DESCRIPTION OF THE PREFERRED EMBODIMENT

The present invention will now be described in detail in conjunction with the accompanying drawings.

Figure 2:
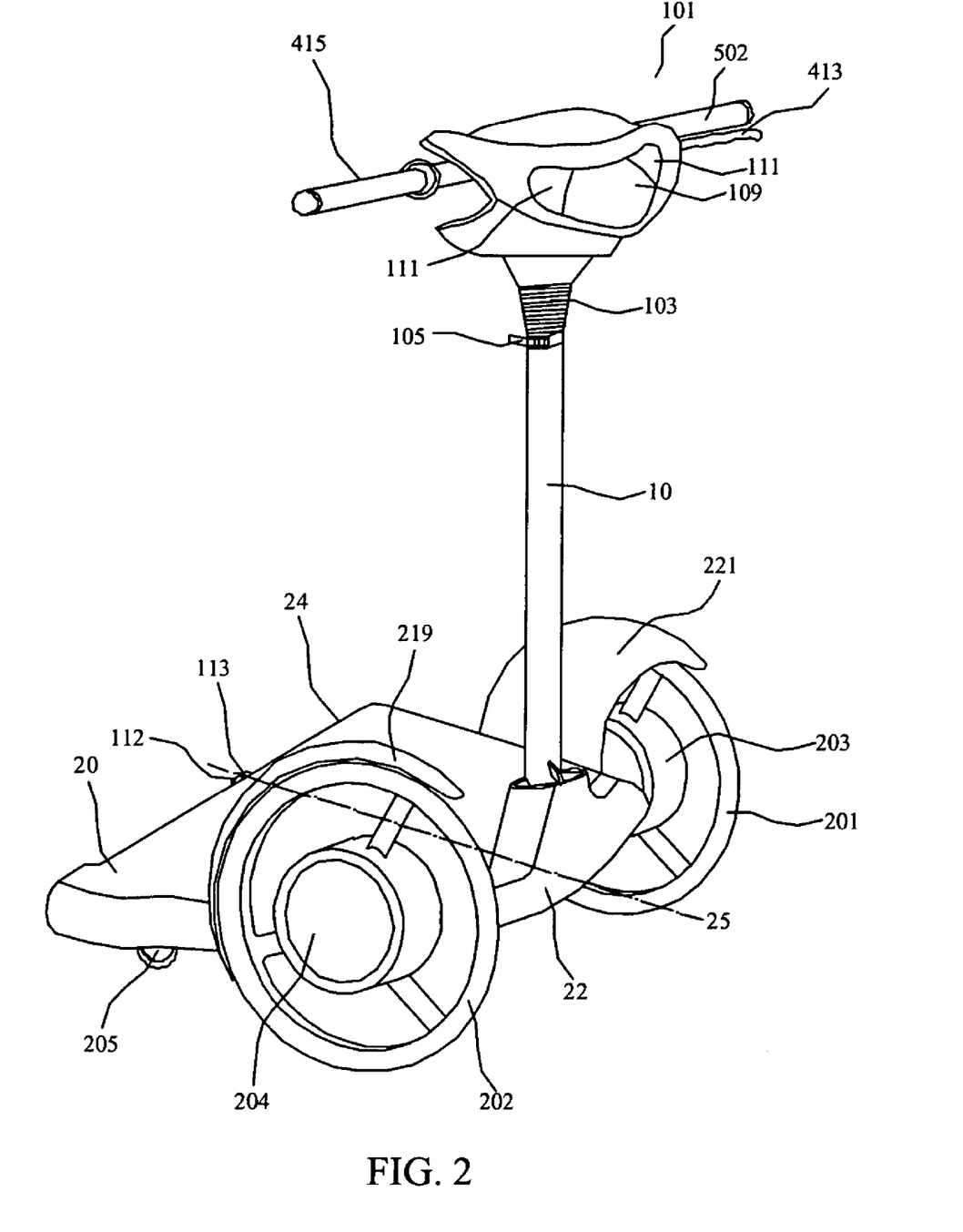
FIG. 2 is a perspective structural view of an electric-driven vehicle according to the present invention.

FIG. 2 is a perspective structural view of an electric-driven vehicle according to the present invention. As shown in FIG. 2, the electric-driven vehicle comprises a upright tube 10 and a supporting platform 20, wherein the supporting platform 20 has a first end 22 and a second end 24 (or front and rear ends, respectively), and a longitudinal axis 25 perpendicular to the first end 22 and the second end 24. The upright tube 10 is pivotally connected with the supporting platform 20 at the first end 22 of supporting platform 20. A steering handle frame 101 is provided at an up end of the upright tube 10. Wires and braking cables (not shown) are received in the upright tube 10. A left driving wheel 201 and a right driving wheel 202 are respectively provided at opposite sides of the first end 22 of the supporting platform 20. A left electric hub 203 and a right electric hub 204 are respectively fitted in the left driving wheel 201 and the right driving wheel 202. In this embodiment, the left and right electric hubs using two 24V150W Nd—Fe—B permanent magnet brush DC motors are respectively connected with left and right controllers, which respectively receive controlling signals from an accelerator handlebar 415, so as to drive the left and right driving wheels (201, 202) independently, the wheels are driven synchronously when the electric-driven vehicle moving in the straight direction. The supporting platform 20 further has two steering rear wheels provided on a bottom near the second end thereof. In this embodiment, two steering rear wheels are provided. A first steering wheel 205 and a second steering wheel 206 (not shown) are operatively connected with the supporting platform 20 via a first steering knuckle 207 and a second steering knuckle 208, respectively. For convenience, the first steering wheel 205 and the second steering wheel 206 can be also referred as the left steering wheel and the right steering wheel. A power supply means 209 (not shown) is also provided on the bottom of the supporting platform 20, and electrically connected with the left and right electric hubs (203, 204) via the left and right controllers, so as to supply power to the left and right electric hubs (203, 204). A steering control arrangement 30 (not shown) which will be described in detail later is provided in the supporting platform 20. A first end of the steering control arrangement 30 is connected with a lower end of the upright tube 10, a second end of the steering control arrangement 30 is connected with the steering knuckle (not shown) of the steering wheels, thereby the torsion of the upright tube 10 is transmitted to the steering knuckles to change the direction of the electric-driven vehicle. A lower end of the handle frame 101 is extended through an extendable rubber-made sealing housing 103 and fitted on an upper end of the upright tube 10, and fixed with the upright tube 10 by a quick clamp 105 provided on the upright tube 10. After unlocking the quick clamp 105, the height of the handle frame 101 can be adjusted to a desired position, and then the handle frame 101 is fixed with the upright tube 10 again by locking the quick clamp 105. A front side of the handle frame 101 is provided with a headlamp 109, which is electrically connected with the power supply via a lamp switch provided on the handle frame 101. Opposite sides of the headlamp 109 are respectively provided with two direction signal lamps 111, which are electrically connected with the power supply via direction signal lamp switches provided at the handle frame 101, respectively. The rear end of the supporting platform 20 is provided with back lamps 112 and braking lamps 113, which are electrically connected with the power supply via the lamp switch provided on the handle frame 101 and the braking grip 413, respectively. When the headlamp is switched on, the back lamps 112 are lighted at the same time. When the electric circuit of the braking lamps 113 conducts with the power supply in a braking, the braking lamps 113 is lighted. In the afore described electric-driven vehicle, the braking grip is further provided with a brake locking mechanism, which will be explained later in detail with reference to FIGS. 6a and 6b. When the braking grip is gripped and a locking member is actuated, the electric-driven vehicle is retained in the brake locking status to be kept from slipping on slop with an angle of 10°. Gripping the braking grip once again, the locking status of the vehicle is able to be released. In the brake locking status, a red indicator light on a panel of the electric-driven vehicle is lighted to indicate the brake locking status, at the same time the electric hubs are power interrupted to be kept from rotation. In the electric-driven vehicle, the panel of the vehicle is further provided with other illuminant means, which are electrically connected with the power supply for indication of the status of the vehicle. The illuminant means involve five LEDs of different colors, a first LED for indication of power supply, a second LED for indication of reverse movement, a third LED for indication of low speed, a fourth LED for indication of the headlamp and back lamps and a fifth LED for indication of the braking power off or locking status.

In this embodiment, the left and right driving wheels (202, 203) are respectively provided with a left mudguard 219 and a right mudguard 221. The electric-driven vehicle of the present invention may also be provided with a klaxon and a switch for the klaxon if it is desired. To enhance the safety of the riding, contracting brakes may also be provided on the left and right driving wheels in order to obtain a braking function of the whole vehicle, the technology of which is apparent for those skilled in the art.

Figure 3:
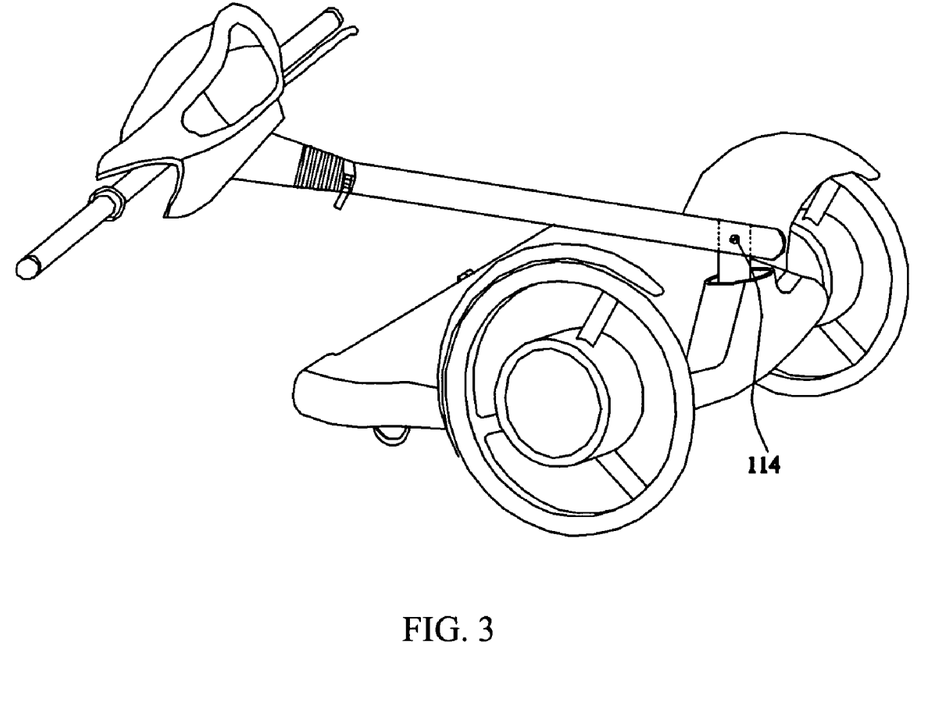
FIG. 3 is a perspective view showing the electric-driven vehicle according to the present invention in a collapsed status.

The lower end of the upright tube 10 is operatively connected with the supporting platform 20. The upright tube 10 is collapsible in backward direction about a pivotal shaft 114. As shown in FIG. 3, the electric-driven vehicle according to the present invention is in its collapsed status. It can be seen clearly from the drawing that, the upright tube 10 is pivoted around the pivotal shaft 114 towards the second end of the supporting platform 20 until the upright tube 10 is completely collapsed.

Figure 4:
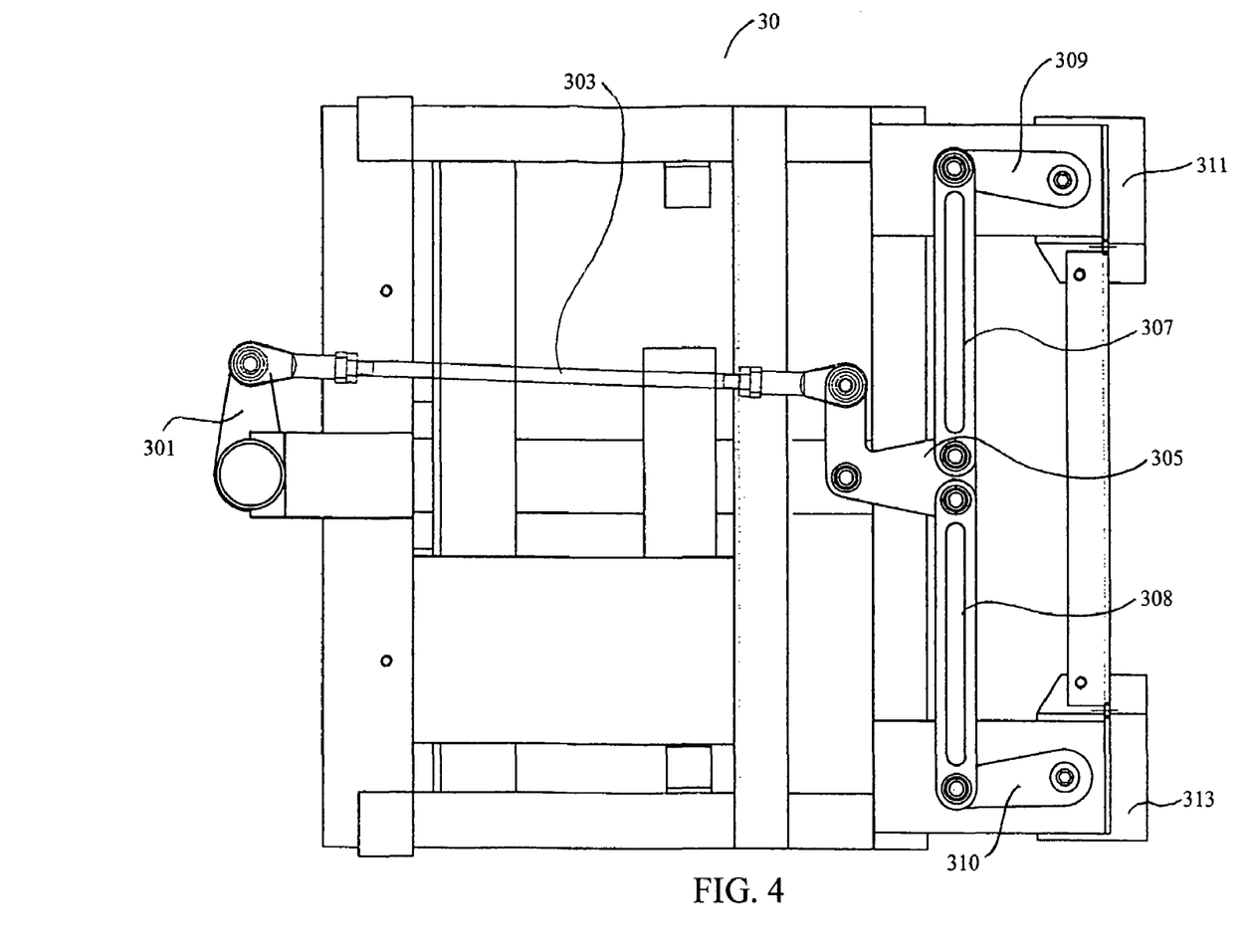
FIG. 4 is a schematic plan view of a steering controlling mechanism of the electric-driven vehicle according to the present invention.

FIG. 4 is a schematic plan view of the steering controlling mechanism of the electric-driven vehicle according to the present invention. The steering controlling mechanism 30 of the electric-driven vehicle comprises a driving rocker 301, a pull-rod 303, a L-shaped rocker 305, a first link rod 307, a second link rod 308, a first driven rocker 309, and a second driven rocker 310. The driving rocker 301 has a first end thereof fixedly connected with a steering post provided at the lower end of the upright tube 10 via a connecting member, thereby the driving rocker 301 moves along with the rotation of the upright tube 10. The pull-rod 303 extending longitudinally has a first end thereof pivotally connected with a second end of the driving rocker 301. The L-shaped rocker 305 has a pivot center pivotally connected with the supporting platform 20 via a connecting member, and has a first end thereof pivotally connected with a second end of the pull-rod 303. The first link rod 307 has a first end thereof pivotally connected with a second end of the L-shaped rocker 305 and a second end thereof pivotally connected with the first steering knuckle 207 (not shown) via a connecting member so as to drive the first steering knuckle 207 (not shown) to rotate. The second link rod 308 has a first end thereof pivotally connected with a second end of the L-shaped rocker 305 and a second end thereof pivotally connected with the second steering knuckle 208 (not shown) via a connecting member so as to drive the second steering knuckle 208 (not shown) to rotate. The first steering knuckle 207 (not shown) and the second steering knuckle 208 (not shown) are respectively connected with a first mounting frame 311 and a second mounting frame 313. In this embodiment, two steering knuckles are used, each one being connected with one steering wheel, that is to say, a four-wheel arrangement is used in this embodiment, wherein two front wheels are driving wheels and two rear wheels are steering wheels. However, in other embodiment of the present invention, two driving wheels with one steering wheel are also practicable, i.e. two front wheels are driving wheels and one rear wheel is the steering wheel, the structure of which is known in the art. Additionally, in the structure of two-driving wheel and one steering wheel, two auxiliary small wheels may be respectively connected at the left and right mounting frame via two cardan joints in order to improve the stability of the electric-driven vehicle, the structure is well known in the art, so it is omitted herein for briefness of the text.

Figure 5:
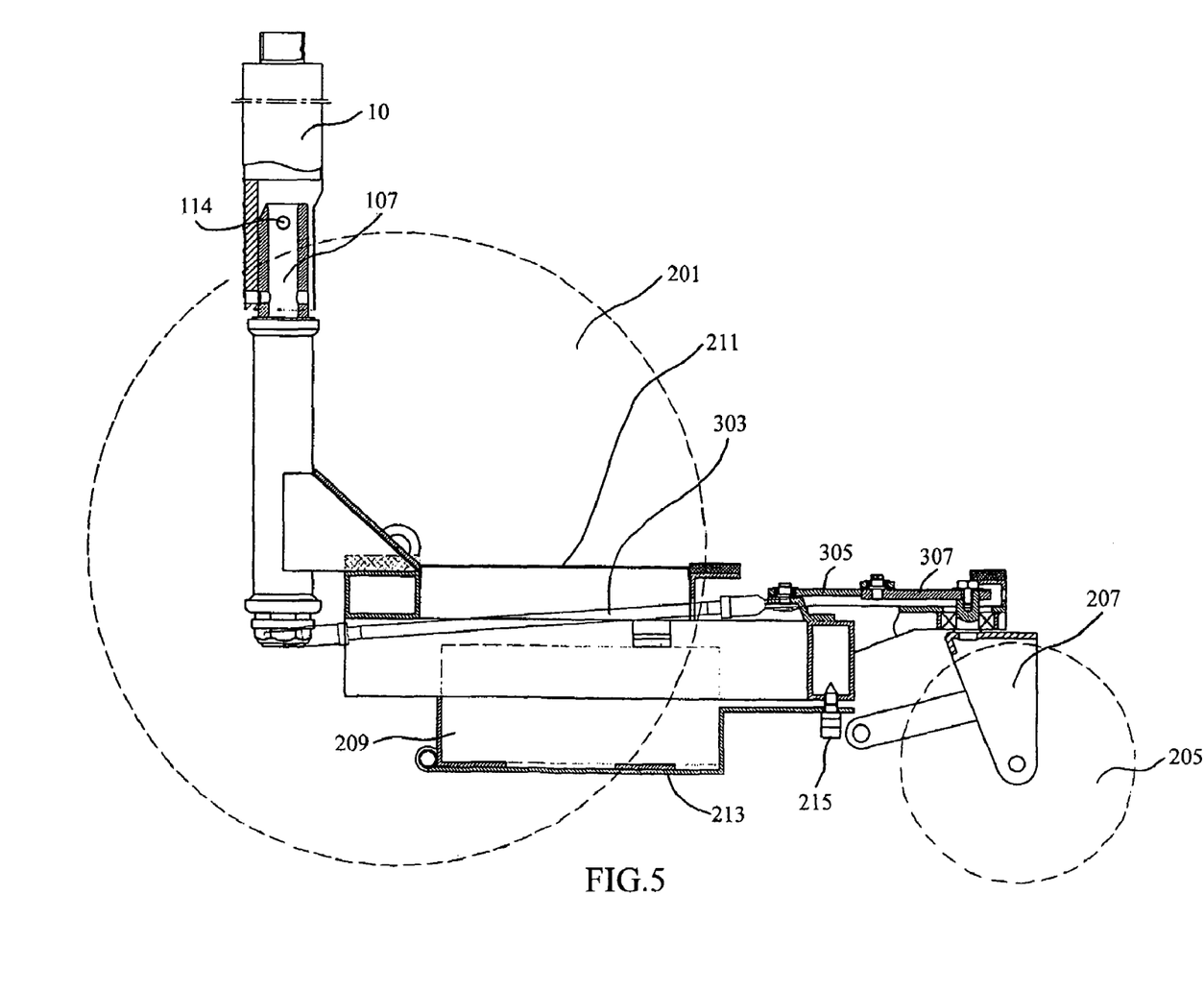
FIG. 5 is a schematic cross sectional view showing a driving wheel, an upright tube, a supporting platform and a steering wheel of the electric-driven vehicle according to the present invention.

FIG. 5 is a schematic cross sectional view showing a driving wheel, an upright shaft, a supporting platform and a steering wheel of the electric-driven vehicle according to the present invention. As shown in FIG. 5, the lower end of the upright tube 10 is connected with a steering post 107, which has a lower end thereof fixedly connected with the first end of the driving rocker 301 (not shown). The first end of the pull-rod 303 is pivotally connected with the second end of the driving rocker 301 (not shown). The L-shaped rocker 305 has a pivot center pivotally connected with the supporting platform 20 via a bearing, the first end thereof pivotally connected with the second end of the pull-rod 303. The first link rod 307 has the first end thereof pivotally connected with the second end of the L-shaped rocker 305 and a second end thereof pivotally connected with the first steering knuckle via a connecting member so as to drive the first steering knuckle to rotate. The second link rod 308 (not shown) has the first end thereof pivotally connected with the second end of the L-shaped rocker 305 and a second end thereof pivotally connected with the second steering knuckle via a connecting member so as to drive the second steering knuckle to rotate. Therefore, the steering wheels are respectively connected and oriented by the first steering knuckle 207 and the second steering knuckle 208 (not shown). A fixing plate 211 for the controller is secured on a top of the supporting platform 20 for assembling the left and right controllers and relay thereon, in this embodiment, the controller is a PWM controller. A battery frame 213 is fixed on the bottom of the supporting platform 20 via a plurality of fasteners 215 for receiving the power supply means 209 therein. In this embodiment, as the power supply means 209 and the controllers are provided at the lower portion of the supporting platform 20, the maintenance of the vehicle becomes easy, and the gravity center of the whole electric-driven vehicle is lowered, so that the stability of the vehicle is increased.

Figure 6A:
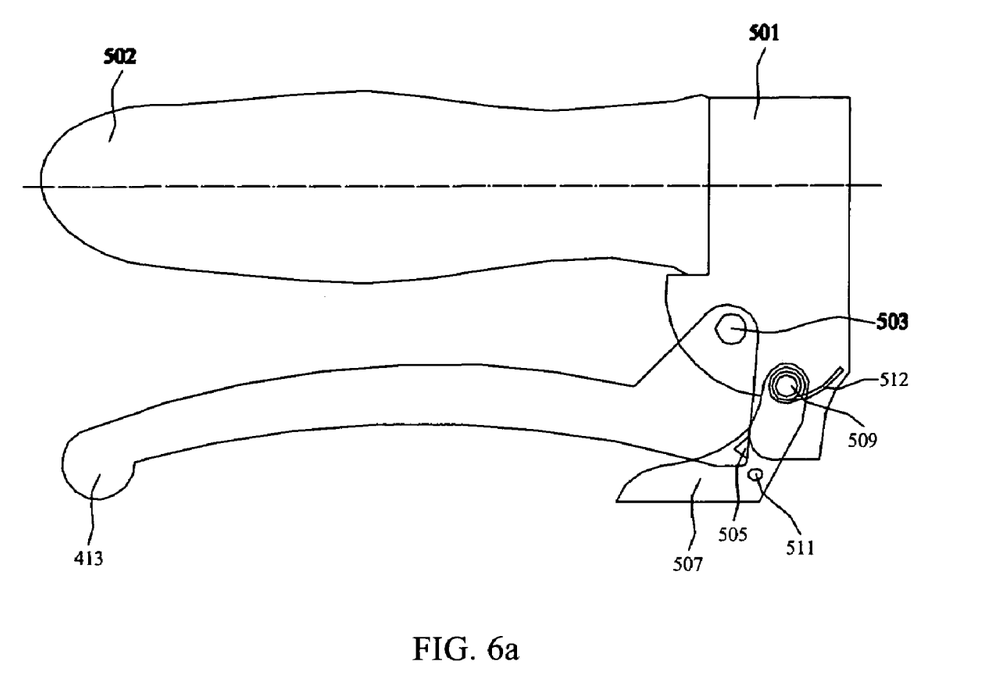
FIG. 6a is a schematic plan view of a brake locking mechanism, showing the brake locking mechanism and the braking grip in an un-braking status.
Figure 6B:
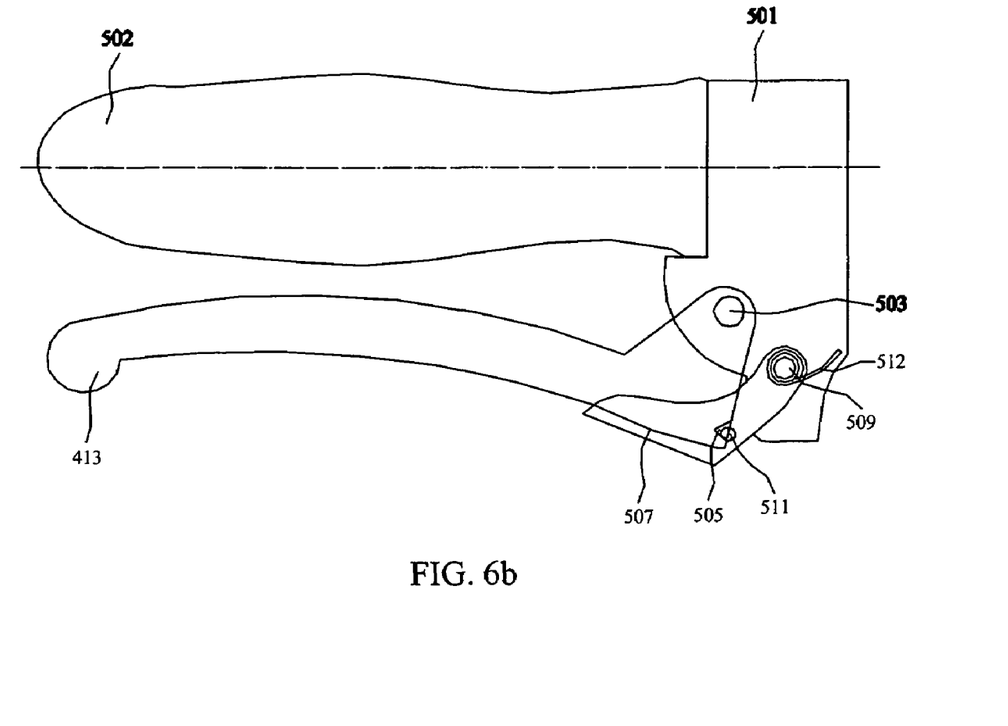
FIG. 6b is a schematic plan view of a brake locking mechanism, showing the brake locking mechanism and the braking grip in a braking status.

FIG. 6a is a schematic plan view of a brake locking mechanism, showing the relationship between the brake locking mechanism and the braking grip in a state of un-braking. FIG. 6b is schematic plan view of a brake locking mechanism, showing the brake locking mechanism and the braking grip in a braking status. As shown from FIGS. 6a and 6b, a fixing seat 501 for the handlebar and the braking grip is formed at an end portion of the handle frame 101. The braking grip 413 has a first end thereof pivotally connected with the fixing seat 501 via-a pivot 503, and has a notch 505 defined therein proximally to the first end thereof. The handle frame is further provided with the brake locking mechanism comprising a locking member 507, which has a first end thereof pivotally connected to the fixing seat via a pivot 509 disposed at an interval from the pivot 503 of the braking grip 413, a spindle 511 fixed on the locking member 507 corresponding to the shape of the notch 505 defined in the braking grip 413, and a resilient member 512 having a first end thereof securely fixed on the braking grip and a second end thereof biased against the locking member 507. The braking grip 413 is retained in a normally un-braking original position by the resilience of the resilient member, in this embodiment, the resilient member 512 is a resilient coil spring. When the braking grip 413 is released completely, the electric-driven vehicle is in the un-braking status, as shown in FIG. 6a. When the braking grip 413 is gripped inwardly, the electric-driven vehicle is in the braking status, at this time, the locking member 507 may be shifted into a locking position a thumb while the braking grip 413 is released slightly until the spindle 511 of the locking member 507 is locked into the notch 505, thus the braking grip 413 is locked, and the electric-driven vehicle is retained in the brake locking status. To release the vehicle from the brake locking status, the braking grip should be gripped inwardly once again, the spindle 511 of the locking member 507 is released from the notch 505 by the resilience of the resilient member 512, and the locking member 507 returns back to the normal original status as seen in FIG. 6a. Apart from the above, if the brake locking status is forgot to be released before starting, the starting signal from the controller will be automatically interrupted by utilizing the braking power interruption function, thereby the electric-driven vehicle is not able to start, and a red alarm indicator will be lighted to remind the rider.

Figure 7:
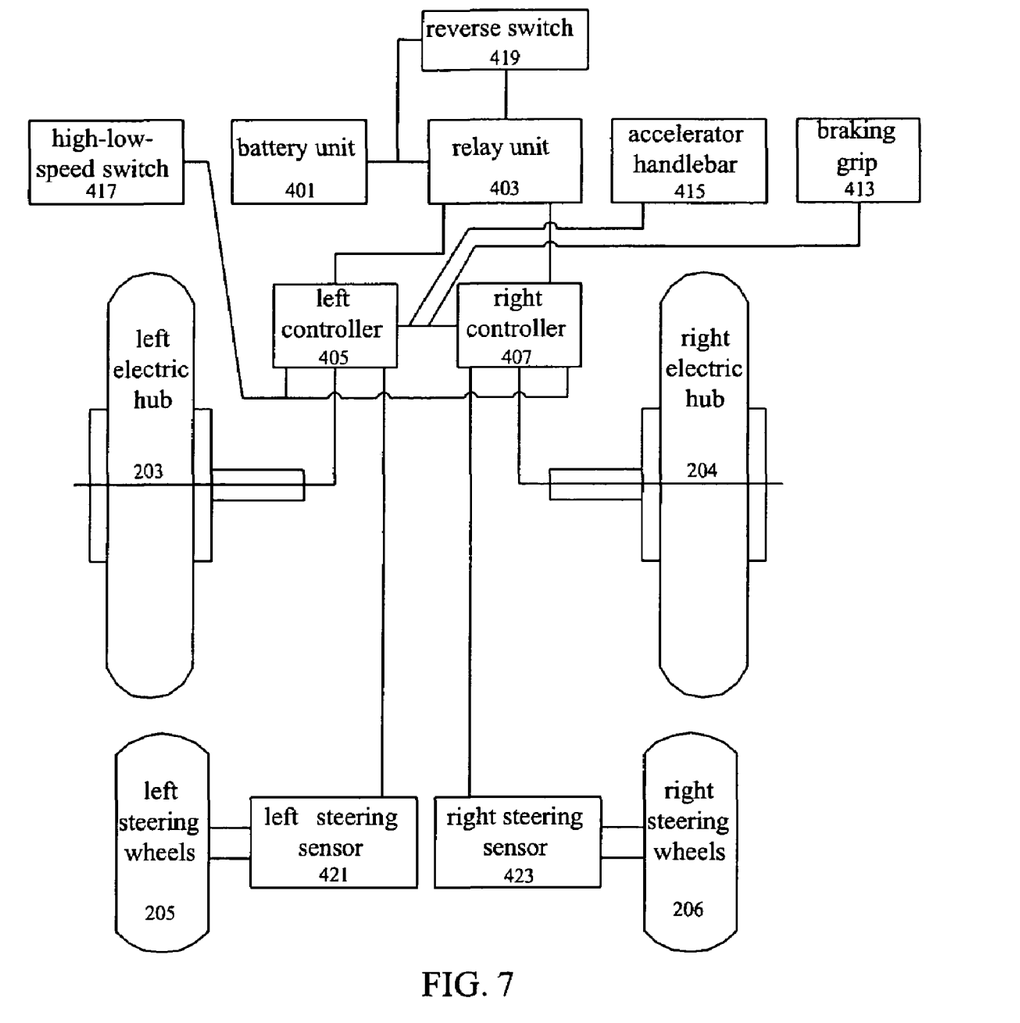
FIG. 7 is a schematic circuit diagram of the electric-driven vehicle according to a first embodiment of the present invention.

FIG. 7 is a schematic circuit diagram of the electric-driven vehicle according to the present invention. In this embodiment, the power supply means uses a battery unit 401, which is electrically connected with the left electric hub 203 and the right electric hub 204 via the relay unit 403 and the left controller 405 and the right controller 407 respectively. The accelerator handlebar 415 is electrically connected to the left controller 405 and the right controller 407 and has a Hall unit installed therein to conduct with the left controller 405 and the right controller 407 and so as to increase the voltage progressively, thereby the left and right electric hubs (203, 204) are driven to start running progressively till the speed of the vehicle reaches the maximum (for example 10 miles/hour), therefore a continuous speed regulation function is performed. The braking grip 413, as well as the accelerator handlebar 415, is electrically connected to the left controller 405 and the right controller 407, whereby when the braking grip 413 is actuated, the electric circuit for transmission of voltage signal of a speed sensor between the accelerator handle 415 and the left and the right controller (405, 407), thus the left and right electric hubs (203, 204) is power interrupted. A high-low-speed switch 417 is provided on the handle frame and electrically connected to the left controller 405 and the right controller 407, thereby the speed of the vehicle is ranged in two steps, the maximum speed of the high step being 10miles/hour, the maximum speed of the low step being 6 miles/hour. The handle frame 101 of the electric-driven vehicle is further provided with a reverse switch 419 which has one end thereof electrically connected to the battery unit 401, and another end thereof electrically connected to the relay unit 403, thereby the electric-driven vehicle is able to be reversed in conjunction with the relay unit 403, and meanwhile, the maximum reversing speed is limited in 3 miles/hour, and continuous speed regulation is performed by adjusting the rotation angle of the accelerator handle 415. A left steering sensor 421 and a right steering sensor 423 which are respectively fixed on the left and right steering wheels (205, 206) are electrically connected with the left controller 405 and the right controller 407, respectively. When the direction of the left and right steering wheels (205, 206) are changed, the speed of the left and right electric hubs (203, 204) become different according to signals received from the left and right steering sensors (405, 407), thus the steering operation is benefited and the stability of the vehicle is increased. When the steering wheels turn to a critical angle, an inner side one of the steering wheels is power interrupted, thereby the vehicle is able to turn around at the original point.

Figure 8:
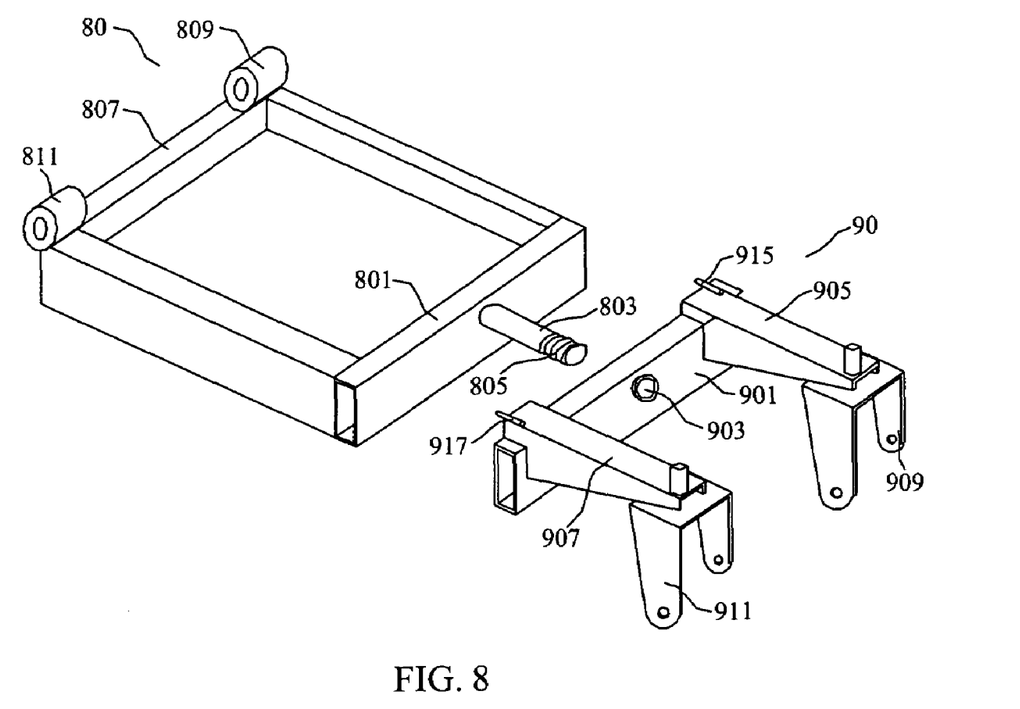
FIG. 8 is a schematic view of the disassembled supporting platform structure according to the present invention.

FIG. 8 is a schematic view of the disassembled supporting platform structure according to the present invention. The supporting platform structure comprises a first portion 80 and the second portion 90. The first portion 80 is shaped as a rectangle and has a first side 801 on the middle of which an axis 803 is provided, and the screw threads 805 are provided on the end of the axis 803. Sleeves 809 and 811, on which the driving wheels (not shown) are mounted, are provided on the two ends of the side 807 opposite to the first side 801. The second portion 90 has a second side 901 on which a hole 903 is provided on a position corresponding to the axis 803. The axis 803 can be inserted into the hole 903. Two cross-girders 905 and 907 are perpendicularly mounted on the two ends of the second side 901, respectively, and two knuckle pivots 909 and 911, on which the steering wheels (not shown) are operatively mounted, are operatively mounted on the cross-girders 905 and 907, respectively. Position limit members 915 and 917 are provided on the cross-girders 905 and 907 respectively for limiting the angle that the second side 901 of the second portion 90 rotates around the axis 803, and the angle is preferably limited within ±3°. The reasons for the angle limited within ±3° lies in that the centrifugal force generated due to the turning of the electric-driven vehicle will cause the center of gravity of the rider and the vehicle move outwardly, thus increasing the pressure on the front wheel (driving wheel) and the rear wheel (steering wheel), when the two steering wheels can rock relative to the front wheel in the horizontal direction, if the angle is not limited, the outer front wheel and the two rear wheel a new support triangle due to the rocking, that is to say, the pressure applied to the ground by the front wheel in the inner side is decreased, even the front wheel in the inner side will tilt, causing the electric-driven vehicle to be turn over. It has been proved in practice that to limit the angle within ±3° can prevent the vehicle from tilt excessively and thus prevent the electric-driven vehicle from turning over. In addition, based on the size of the vehicle of the present invention, limiting the angle within ±3° makes the up and down rocking of the rear wheel around 9 mm, for example, the four wheels can all be on the ground when the wheel span being 500 mm, wheel base being 407 mm, in an area of around 0.2 m², and depth of the dents no more than 18 mm. The electric-driven vehicle employing the supporting platform of the present invention is usually used on the road, sidewalk and in doors, usually the dents are slight and the configuration of up and down rocking of 9 mm is sufficient. However, it is obvious for one skilled in-the art that the limited angle and the up and down rocking range as required. Also, it is obvious for one skilled in the art that the axis 803 and the second side 901 can be formed as a whole, and the position limit members 915 and 917 can be formed with the cross-girders 905 and 907 as a whole. Alternatively, the position limit members 915 and 917 can be provided on the first portion and formed as a whole with the first portion.

Figure 9:
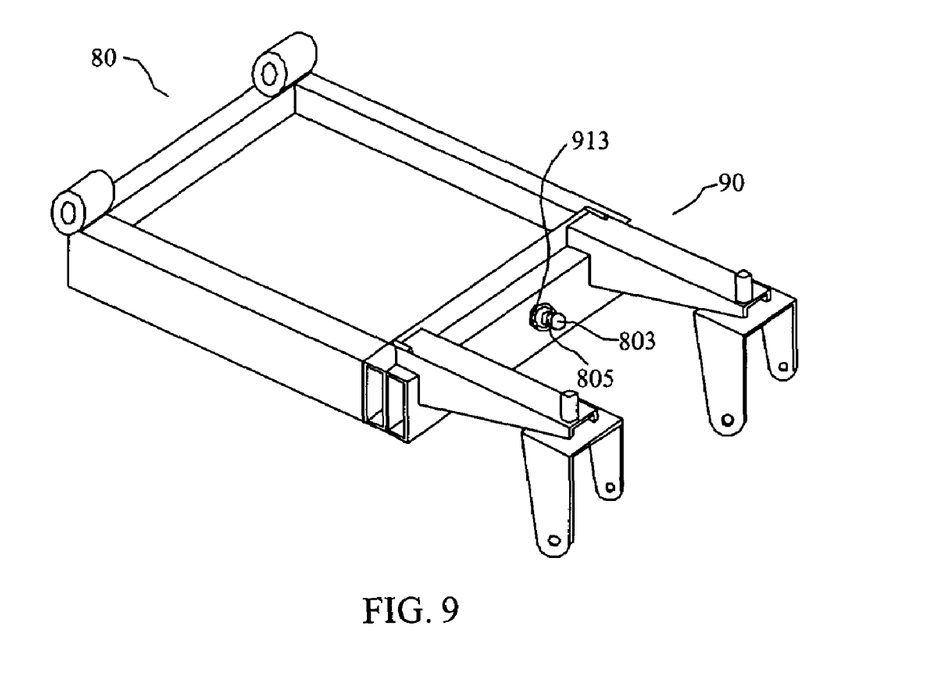
FIG. 9 is a schematic view of the assembled supporting platform structure shown in FIG. 8.

FIG. 9 is a schematic view of the assembled supporting platform structure shown in FIG. 8. As shown in FIG. 9, the first portion 80 and the second portion 90 can be connected by screwing the screw threads 805 on one end of the axis 803 into the nut 913.

Figure 10:
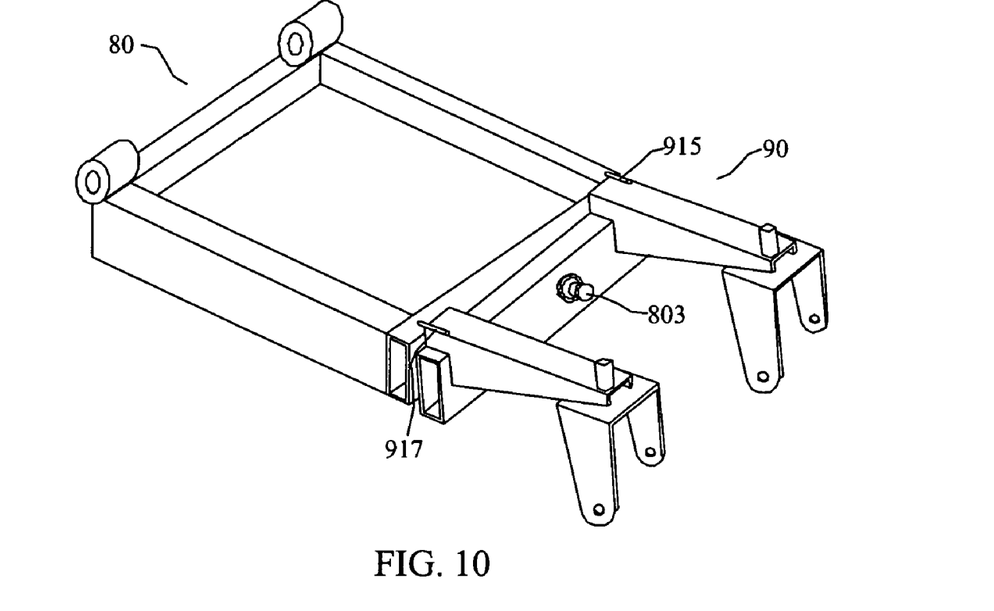
FIG. 10 is a schematic view showing the supporting platform structure shown in FIG. 9 in a turning status.

FIG. 10 is a schematic view showing the supporting platform structure shown in FIG. 9 in a turning status. When the electric-driven vehicle is running on an uneven road surface, the second portion 90 rotates around the axis 803, and the position limit members 915 and 917 limit the position to which the second portion 90 rotates.

Figure 11:
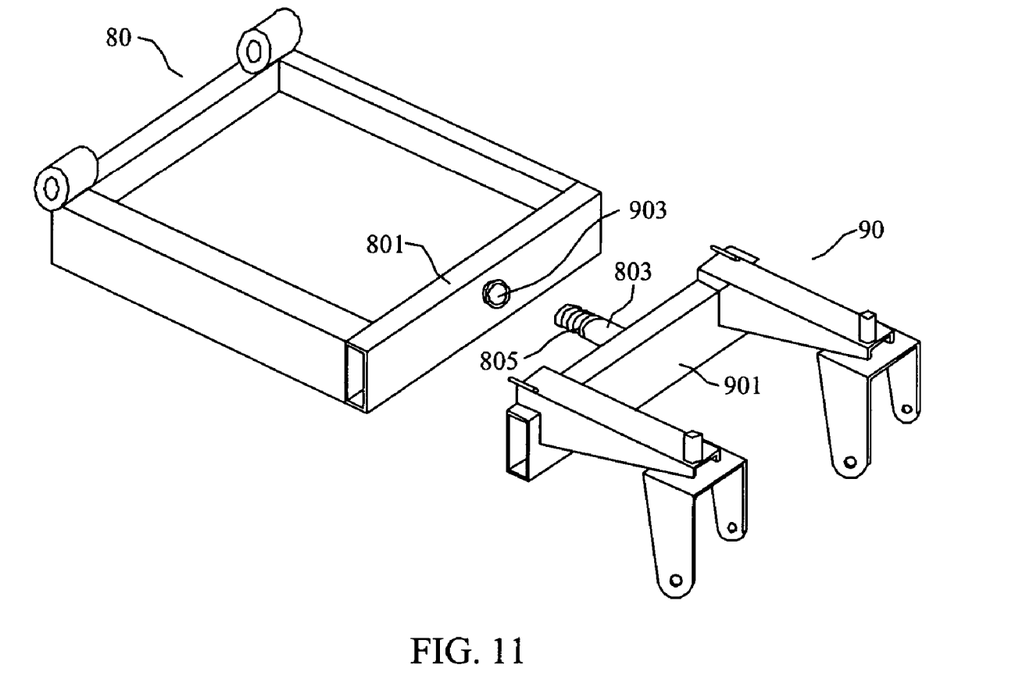
FIG. 11 is a schematic view of the supporting platform structure according to a second embodiment of the present invention.

FIG. 11 is a schematic circuit view of the supporting platform structure according to a second embodiment of the present invention. Different from the supporting platform structure in the first embodiment of the present invention shown in FIG. 2, the axis 803 is provided on the middle of the second side 901 of the second portion 90, and the hole 903 is provided on a position corresponding to the axis 803 on the first side 801 of the first portion 80.

Figure 12:
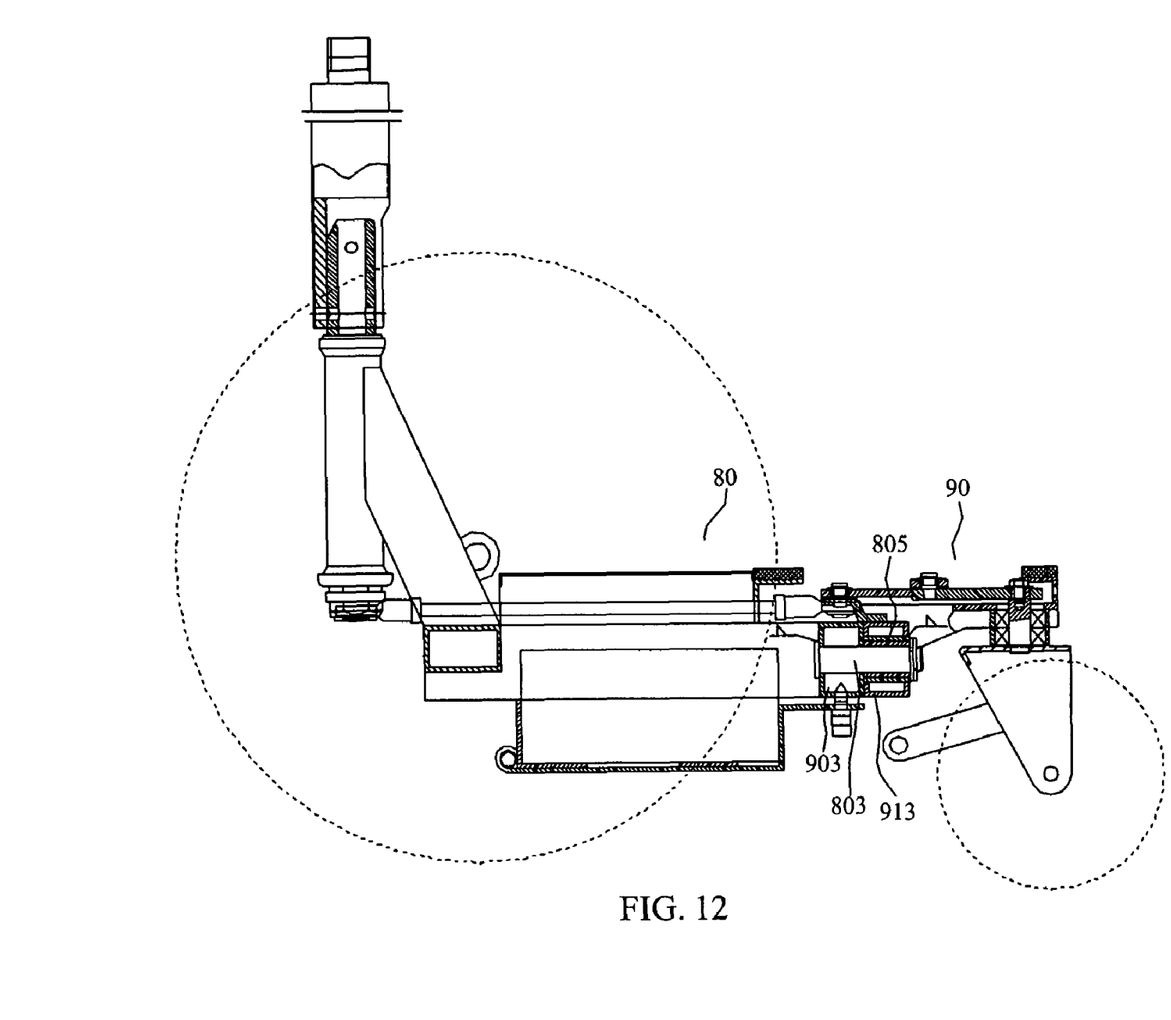
FIG. 12 is a schematic cross sectional view showing an electric-driven vehicle employing the supporting platform according to the first embodiment of the present invention.

FIG. 12 is a schematic cross sectional view of the supporting platform according to the first embodiment of the present invention. As shown in the figure, the axis 803 provided on the first side 801 of the first portion 80 goes through the hole 903 provided on the second side 901 of the second portion 90. The first portion 80 and the second portion 90 are connected by screwing the screw threads 805 on one end of the axis 803 into the nut 913.

The supporting platform of the present invention can overcome the problems in the art and improve the braking security of the vehicle.

The described embodiments of the present invention are intended to be merely exemplary and numerous variations and modifications will be apparent to those skilled in the art. All such variations and modifications are intended to be within the scope of the present invention as defined in the appended claims.

What is claimed is:

1. A drive mechanism for a vehicle comprising:
a supporting platform having a first end, a second end, and a longitudinal axis perpendicular to the first and second ends;
an upright tube provided at a first end of the supporting platform and operatively connected with the supporting platform, and having a handle frame fitted on a top end thereof;
a power supply means;
a driving means electrically connected with the power supply means;
at least two driving wheels driven by the driving means, wherein the driving wheels are operatively mounted at opposite sides of the first end of the supporting platform and parallel to the longitudinal axis;
at least one steering wheel, which is provided at the second end of the supporting platform;
a steering control arrangement installed in the supporting platform, the steering control arrangement having a first end thereof fixedly connected with a steering post provided at a lower end of the upright tube, and at least one second end thereof connected with at least one steering knuckle, and wherein the at least one steering wheel is connected to the at least one steering knuckle, thereby the torsion of the upright tube being transmitted to the at least one steering knuckle via the steering control arrangement to drive the at least one steering wheel to rotate in order to enable the electric-driven vehicle to turn correspondingly; and
wherein the steering control arrangement comprises a driving rocker having a first end thereof fixedly connected with the steering post provided at the lower end of the upright tube so as to turn along with the upright tube, a pull-rod having a first end thereof pivotally connected with a second end of the driving rocker, an L-shaped rocker having a pivot center pivotally connected with the supporting platform, and a first end thereof pivotally connected with a second end of the pull-rod, wherein the steering control arrangement further comprises at least one link rod having a first end thereof pivotally connected with a second end of the L-shaped rocker and at least one driven rocker having a first end thereof pivotally connected with a second end of the at least one link rod, and a second end thereof fixedly connected with the steering knuckle so as to drive the steering knuckle to rotate.

2. The mechanism of claim 1, wherein first and second steering wheels are operatively mounted on a bottom of the second end portion of the supporting platform and parallel to the longitudinal axis.

3. The mechanism of claim 1, wherein the handle frame is extendably fitted on the top end of the upright tube, and able to be positioned or re-positioned by using a quick clamping device provided on the upright tube.

4. The mechanism of claim 3, wherein the lower end of the upright tube is pivotally connected with the supporting platform, thereby the upright tube is selectively collapsible towards the second end of the supporting platform.

5. The mechanism of claim 1, wherein the power supply means is provided on a bottom of the supporting platform.

6. The mechanism of claim 1, wherein the driving means is installed in the driving wheel in order to drive the driving wheel to rotate.

7. The mechanism of claim 6, wherein the driving means includes a left electric hub and a right electric hub, which are respectively installed in the middle of the two driving wheels.

8. The mechanism of claim 7, wherein a controller provided under the supporting platform includes a left controller and a right controller, which are electrically connected with the left electric hub and the right electric hub, respectively, and wherein the left controller and the right controller are electrically connected with the power supply means via a relay unit.

9. The mechanism of claim 8, wherein a reverse switch is provided on the handle frame, a first end of the reverse switch is electrically connected to the power supply means, and a second end of the reverse switch is electrically connected to the relay unit, thereby the electric-driven vehicle is able to be reversed.

10. The mechanism of claim 8, wherein a high-low-speed switch is provided on the handle frame and electrically connected with the left electric hub and the right electric hub so as to regulate the speed of the left electric hub and the right electric hub.

11. The mechanism of claim 8, wherein a braking grip and an accelerator handlebar are provided on the handle frame and electrically connected with the left controller and the right controller.

12. The mechanism of claim 11, wherein the braking grip has a first end thereof pivotally connected with a fixing seat formed on one end of the handle frame via a pivot pin, and has a notch defined therein proximal to the first end thereof.

13. The mechanism of claim 12, wherein a brake locking mechanism is provided on the handle frame, the brake locking mechanism comprises:
a locking member having a first end thereof pivotally connected to the fixing seat via a pivot which is disposed at an interval from the pivot pin of the braking grip, the locking member is provided with a spindle corresponding to the shape of the notch; and
a resilient member, which is mounted around the pivot of the locking member and having a first end thereof connected with the fixing seat and a second thereof biased against the locking member, thereby the braking grip is retained at a normal un-braking original position by the resilience of the resilient member.

14. The mechanism of claim 13, wherein the resilient member is a resilient coil spring.

15. The mechanism of claim 8, wherein the steering wheels include a first steering wheel and a second steering wheel, which are respectively connected with a left steering sensor and a right steering sensor which are electrically connected with the left controller and the right controller.

16. The mechanism of claim 1, wherein a front side of the handle frame is provided with a headlamp, which is electrically connected with the power supply means via a lamp switch.

17. The mechanism of claim 1, wherein the front side of the handle frame is provided with direction signal lamps, which are electrically connected with the power supply means via switches of the direction signal lamps.

18. The mechanism of claim 1, wherein the second end of the supporting platform is provided with back lamps and braking indicator lamps, which are electrically connected with the power supply means via the lamp switch and the braking grip.

19. The mechanism of claim 1, wherein a panel is provided on the handle frame and electrically connected with the power supply means in order to display the speed of the electric-driven vehicle and the voltage of the power supply means.

20. The mechanism of claim 19, wherein a plurality of illuminant means for indication of the status of the electric-driven vehicle is provided on the panel and electrically connected with the power supply means.

21. The mechanism of claim 20, wherein the illuminant means includes five LEDs, a first LED for indication of the power supply, a second LED for indication of reverse movement of the vehicle, a third LED for indication of low speed running, a fourth LED for indication of lamps, and a fifth LED for indication of braking and power interrupted status or brake locking status.

22. The mechanism of claim 7, wherein regenerated braking of the electric hub is performed by an electrical control system.

23. The mechanism of claim 1, wherein the supporting platform comprises:
 a first portion comprising sleeves for mounting driving wheels and a first side; and
 a second portion comprising knuckle pivots for mounting steering wheels and a second side corresponding to the first side, wherein the first side of the first portion and the second side of the second portion are connected via a connecting member, and wherein at least one of the first side and the second side rotate around the connecting member.

24. The mechanism of claim 23, wherein the connecting member comprises an axis being provided on the middle of and perpendicular to the first side of the first potion and being in the same plane with the first portion, and wherein the second side of the second portion is provide with a hole on the position corresponding to the axis, and the axis can go through the hole.

25. The mechanism of claim 23, wherein the connecting member comprises an axis being provided on the middle of and perpendicular to the second side of the second potion and being in the same plane with the second portion, and wherein the first side of the first portion is provide with a hole on the position corresponding to the axis, and wherein the axis goes through the hole.

26. The mechanism of claim 24, wherein an end of the axis distant from the fixed end is provided with screw thread for engaging with a nut, preventing the disengagement of the first portion and the second portion.

27. The mechanism of claim 24, wherein the second portion is provided with position limit members, and the position limit members limits the position of the second portion when the second potion rotates around the axis.

28. The mechanism of claim 27, wherein the position limit members are formed as a whole with the second portion.

29. The mechanism of claim 25, wherein the first portion is provided with position limit members, and the position limit members limit the position of the first portion when the first potion rotates around the axis.

30. The mechanism of claim 29, wherein the position limit members are formed as a whole with the first portion.

31. The mechanism of claim 27, wherein the position limit members define the limit the angles which the first side of the first portion or the second side of the second portion rotates around the axis.

32. The mechanism of claim 23, wherein the connecting member is formed as a whole with the first side of the first portion or the second side of the second portion.

* * * * *

UNITED STATES PATENT AND TRADEMARK OFFICE
CERTIFICATE OF CORRECTION

PATENT NO. : 7,192,040 B2 Page 1 of 1
APPLICATION NO. : 10/814204
DATED : March 20, 2007
INVENTOR(S) : Shouchun Xie It is certified that error appears in the above-identified patent and that said Letters Patent is hereby corrected as shown below:

At Column 9, Line 61, please delete "-to" and insert --to-- therefor;
At Column 10, Line 42, please delete "via-a" and insert -- via a -- therefor;
At Column 12, Line 37, please delete "in-the" and insert -- in the -- therefor;
At Column 16, Line 3, please delete "potion" and insert -- portion -- therefore;
At Column 16, Line 10, please delete "potion" and insert -- portion -- therefore;
At Column 16, Line 22, please delete "potion" and insert -- portion -- therefore;
At Column 16, Line 28, please delete "potion" and insert -- portion -- therefore;

Signed and Sealed this

Seventh Day of August, 2007

JON W. DUDAS
*Director of the United States Patent and Trademark Office*